United States Patent [19]

Djorup

[11] Patent Number: 5,069,066
[45] Date of Patent: Dec. 3, 1991

[54] CONSTANT TEMPERATURE ANEMOMETER

[76] Inventor: Robert S. Djorup, 20 Lovewell Rd., Wellesley, Mass. 02181

[21] Appl. No.: 521,594

[22] Filed: May 10, 1990

[51] Int. Cl.$^5$ .............................. G01F 1/68; G01P 5/10
[52] U.S. Cl. ................................ 73/204.15; 73/204.18
[58] Field of Search ............ 73/204.15, 204.18, 204.19, 73/204.25, 204.27

[56] References Cited

U.S. PATENT DOCUMENTS

| | | | |
|---|---|---|---|
| 3,220,255 | 11/1965 | Scranton et al. | 73/204.19 |
| 3,352,154 | 11/1967 | Djorup . | |
| 3,363,462 | 1/1968 | Sabin . | |
| 3,900,819 | 8/1975 | Djorup . | |
| 3,991,624 | 11/1976 | Davies . | |
| 4,024,761 | 5/1977 | Djorup | 73/204.15 |
| 4,279,147 | 7/1981 | Djorup . | |
| 4,373,387 | 2/1983 | Nishimura et al. . | |
| 4,503,706 | 3/1985 | Kolodjski . | |
| 4,523,462 | 1/1986 | Kolodjski . | |
| 4,739,657 | 4/1988 | Higashi et al. | 73/204.18 |
| 4,794,794 | 1/1989 | Djorup | 73/204.15 |
| 4,794,795 | 1/1989 | Djorup . | |

OTHER PUBLICATIONS

Perry, A. E., "Hot-Wire Anemometry", Oxford University Press, New York, ISBN 0-19-856327-2 (1982).
Goldstein, Richard J., ed., "Fluid Mechanics Measurements", Hemisphere Publishing Corporation, New York, ISBN 0-89116-244-5 (1983).

Primary Examiner—Herbert Goldstein
Attorney, Agent, or Firm—Choate, Hall & Stewart

[57] ABSTRACT

A constant temperature anemometer having a single self-heated non-zero temperature coefficient resistive anemometer sensing element operated as one arm of a four-arm Wheatstone bridge whose opposing or reference arm contains a temperature sensor, with the four-arm bridge operated as a single arm of a second Wheatstone bridge whose reference arm contains a second temperature sensor, the second bridge operated as the controlled bridge in a constant temperature (constant resistance) anemometer configuration resulting in feedback controlled constant resistance operation of the bridge within a bridge. The sub-bridge output is determined by a differential amplifier, thereby removing the need for a d-c offset or reference signal to remove or suppress the mean heating term obtained electrically across the single heated anemometer sensing element. In effect, differential operation is provided for a single element anemometer transducer. Alternative single element differential operation without temperature sensing is described. Use of different curvature temperature characteristics for the anemometer sensing element and the temperature sensor is disclosed.

9 Claims, 1 Drawing Sheet

CONSTANT TEMPERATURE ANEMOMETER

TECHNICAL FIELD

This invention relates generally to an improved constant temperature anemometer apparatus for determining the motion of a fluid mass that is subject to random temperature changes. The invention is particularly concerned with means to operate a temperature compensated single anemometer sensing element as if it were differentially operated. The invention discloses means to operate an individual sensing element without the disadvantage of a bias or offset in the desired anemometer signal output.

BACKGROUND ART

The use of electrically self-heated resistors, hot wires and hot films, as anemometer transducers is well known in the prior art. In such devices, a heated resistance element serves as a sensing element, and its physical geometry is used to define its spatial response to impinging fluid flow. Most widespread use has been in the measurement of airflow. The sensing element has a non-zero temperature coefficient of resistance and is maintained at constant resistance and, thus, constant temperature while it is operated as part of a feedback controlled electrical bridge circuit. An example of such a prior art constant temperature anemometer circuit is illustrated in FIG. 1 wherein a single sensing element 10 forms one arm of a four arm Wheatstone bridge which is completed by resistances 11, 12 and 13. Differential amplifier 14 is connected to the bridge at points 15 and 16 in order to determine bridge balance or bridge error signal. Amplifier 14 output 17 is fed back to the top of the bridge at the junction of resistors 11 and 13 in order to provide bridge excitation. For clarity's sake, power supply connections are not shown in this figure.

FIG. 2 illustrates the signal form seen at point 17 of FIG. 1. The resulting signal output 17 is unipolar and is markedly non-linear, containing three components: an approximate fourth root term as a function of mean flow, a turbulence component which results from fluctuations in the flow, and a d-c or constant term 19 which is the zero flow quiescent heating signal developed across the complete bridge. Again, referring back to FIG. 1, in the art it is customary for the anemometer output signal to be taken at point 17, the low impedance output of amplifier 14, at the top of the bridge with resistor 11 connected in series with sensing element 10. A more accurate but lower level output can also be taken across sensing element 10, from point 15 to ground 18. Use of output 17 or the potential across resistor 10 are classic ways to read out a single-ended or unbalanced output signal from a constant temperature anemometer. The desired parts of the output signal are mean flow and turbulence components. The constant term 19 or zero offset portion is of little interest. The turbulent component can easily be separated by use of an a-c coupled amplifier, but it is more difficult to separate mean flow from the d-c or constant term 19. An opposing bias voltage is customarily used to offset or balance out the zero flow output value of mean flow. Examples of single-ended unipolar constant temperature anemometer transducers, together with bridge operating circuits therefor, are shown in U.S. Pat. Nos. 3,220,255; 3,352,154; 3,363,462; 3,900,819; 3,991,624; 4,373,387; 4,503,706 and 4,523,462.

The research anemometer user customarily recalibrates his instruments with each use, resets offset or bias adjustments as needed, and his investigations are usually not long in duration. Long term unattended anemometer use is another matter entirely. Temperature drift and stability of bias and offset reference potentials introduce errors and limit the usefulness of the constant temperature anemometer as a field research tool. Temperature compensation of the anemometer is accomplished by using resistor 12 in FIG. 1 to sense ambient temperature and adjust the operating point of sensing element 10. A resistance temperature detector (RTD) or a resistance thermometer or similar temperature sensitive resistor is used in place of fixed low temperature coefficient resistor 12 in order to sense and track ambient temperature variations and automatically adjust anemometer sensitivity to variations in temperature. A detailed discussion of this technique is presented in U.S. Pat. No. 3,363,462, and Sabin's design equations are particularly useful for thermal anemometry generally. A simplified discussion of the technique of temperature compensation is later given in U.S. Pat. No. 4,794,795.

A detailed discussion of the constant temperature anemometer can be found in pages 59 through 92 and 172 through 176 of a book entitled "Hot-wire Anemometry" by A. E. Perry, published in 1982 by Oxford University Press, New York, ISBN 0-19-856327-2. Thermal anemometers are also well described in chapter four, pages 99 through 154, of a book entitled "Fluid Mechanics Measurements", edited by Richard J. Goldstein and published in 1983 by Hemisphere Publishing Corporation, New York, ISBN 0-89116-244-5.

SUMMARY OF THE INVENTION

The present invention provides a significant improvement in the signal readout obtained from a single element constant temperature anemometer through differential operation of the single sensing element. Single-ended offset error contributions to long term error are eliminated by providing an output signal that goes to zero with zero flow.

A bridge within a bridge anemometer configuration is disclosed wherein both bridges include temperature sensitive resistors so that temperature compensated constant temperature anemometer operation is provided. The single anemometer sensing element is operated in series with a fixed resistor within a bridge whose reference arm tracks ambient temperature changes, thereby gaining zero stability. Both constant temperature difference operation above sensed ambient temperature and constant temperature operation without temperature sensing are disclosed for a differentially connected single anemometer sensing element. Signal readout is by a differential amplifier connected across the bridge within a bridge, between the anemometer sensing element branch and the reference branch. Use of different curvature temperature resistance characteristics for the anemometer sensing element and the temperature sensitive resistors is also disclosed.

BEST MODE OF CARRYING OUT THE INVENTION

Figure 1:
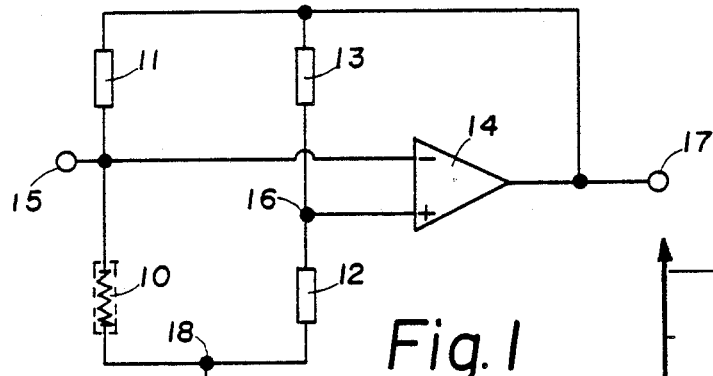
FIG. 1 illustrates a prior art constant temperature anemometer controlled bridge electrical circuit with unipolar output from the single sensing element.
Figure 2:
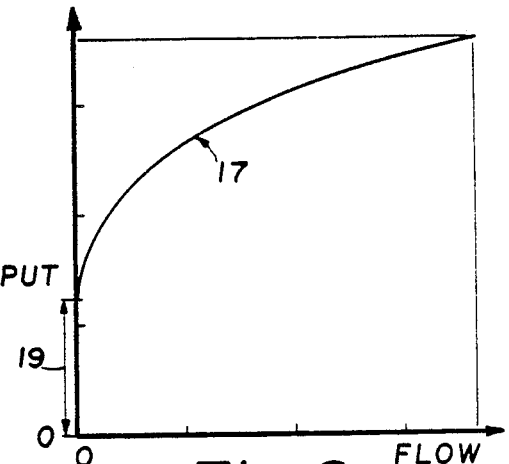
FIG. 2 is a diagram showing the non-linear relationship of the output of a single sensing element constant temperature bridge circuit to wind flow against the sensing element.
Figure 3:
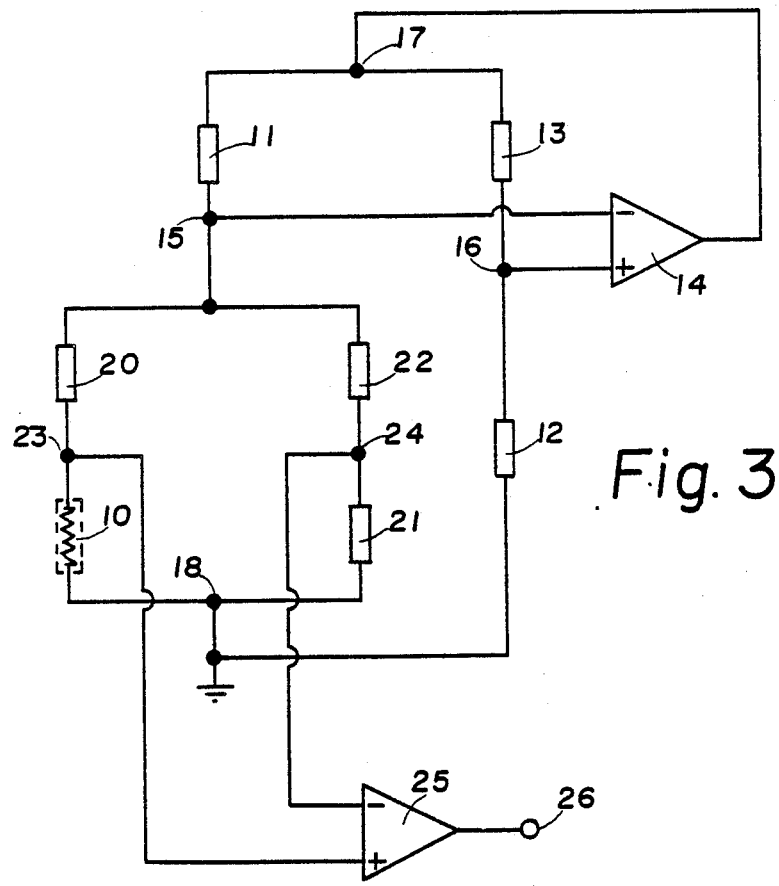
FIG. 3 illustrates a preferred embodiment of the present invention in electrical schematic form.

Referring now to the drawing, and in particular to FIG. 3, the present invention is embodied in preferred form in a simplified schematic diagram of an electrical excitation and readout circuit wherein a single thermal anemometer sensing element 10 is operated with temperature sensitive resistor 21 as part of a bridge within a feedback controlled bridge, in order to provide temperature compensated differential readout of a constant temperature anemometer. Anemometer sensing element 10 is connected as one arm of a four arm Wheatstone bridge which is completed by resistors 20 and 22 and temperature sensitive resistor 21. Both resistors 10 and 21 have similar non-zero temperature coefficients and are exposed to surrounding fluid flow. Resistor 20 is a low temperature coefficient power resistor in series with sensing element 10 and passes the full current used to self-heat sensing element 10. Resistors 21 and 22 are used to balance the sensor bridge at reference conditions, when sensing element 10 is at its quiescent operating temperature, at which point its corresponding resistance is controlled by the rest of the FIG. 3 circuit. Excitation to the bridge is provided at connections 15 and 18. The signal across the sensor bridge at points 23 and 24 is detected and amplified by a differential amplifier 25, thereby providing a signal 26 that is a measure of the degree of imbalance of the bridge. The signal 26, used as the constant temperature anemometer output signal, shows imbalance when impinging fluid flow against sensing element 10 causes heat loss and a signal is developed when power is added to the zero flow quiescent excitation of sensing element 10. Since only one sensing element is used, and power can only be lost from electrically self-heated sensing element 10 to the surrounding fluid flow, the readout signal 26 from amplifier 25 is unipolar, provided that the surrounding fluid is at constant temperature or sensing element 10 is adequately temperature compensated by temperature sensing resistor 21 together with the compensating "message" obtained from the rest of the FIG. 3 circuit. To assist clarity, amplifier power supply connections are not shown in this figure, and input and output resistor pairs are not shown at amplifier 25.

The bridge formed by resistors 20, 21, 22 and sensing element 10 can be considered electrically to be a single resistor that in turn becomes one arm of a second Wheatstone bridge formed by power resistor 11 in series with the first Wheatstone bridge, or sensor bridge, and by resistors 12 and 13 that are used to balance the second bridge at an operating point determined by the values of resistors 12 and 13. Either resistor 12 or 13 can be varied at the time of bridge design or variable resistors may be used for one or the other. This allows operator selection of operating point, power level, and instrument sensitivity. It is preferred not to use potentiometers for both resistors. For maximum stability and long term reliability, the prudent engineer will use only fixed resistors. Amplifier 14 is a high gain differential amplifier having a high current output that is fed back in closed loop fashion to the bridge at point 17. The input to amplifier 14 is taken across the bridge at points 15 and 16, and attention must be paid to phasing, in order to assure that negative feedback is used.

The sensor bridge appears to amplifier 14 to function as a single resistance which is sensitive to any variation in its constituent parts. Sensing element 10 is in fact a non-zero temperature coefficient resistor subject to self-heating, and when platinum metal or nickel metal is used as resistance material, its temperature coefficient is a high positive value. This permits the setting of the values of the resistors 12 and 13 so that the total series-parallel resistance of the sensor bridge, taken as a single equivalent resistance, together with power resistor 11, balance against resistors 12 and 13 to provide the same resistance ratio on each side of the feedback controlled bridge. The active side of the feedback controlled bridge is comprised of resistor 11 together with the sensor bridge, resistors 10 and 20 together with resistors 21 and 22. The reference side of the feedback controlled bridge is comprised of resistors 12 and 13.

When sensing element 10 is cold or is non-operating, its resistance is lower than its operating value. The desired operating value is established by setting the reference resistor 21 and 22 ratio. This ratio will determine the heated resistance value for sensing element 10 required to self-balance the bridge. The feedback loop from amplifier 14 to point 17 operates to automatically adjust the current through the total combined bridges until the resistance of sensing element 10 attains that value of resistance which balances the bridge. A small offset voltage must be present at the output of amplifier 14 when the circuit is first turned on, and sensing element 10 is at ambient temperature, so that the minute bridge current which flows as a result of the offset voltage is sufficient to develop a small error signal between points 15 and 16, thus permitting the circuit to turn itself on to an operating condition. The aforedescribed mode of operation has been described as the constant temperature (constant resistance) method of thermal anemometer operation.

Resistor 12 is a temperature sensitive resistor which is physically located near resistor 21, a similar temperature sensitive resistor, and both are exposed to the surrounding fluid ambient conditions. If the temperature coefficient of resistor 12 is properly selected, the bridge operating level can be automatically adjusted so that ambient temperature is continuously tracked thereby operating sensing element 10 at a constant temperature difference above sensed ambient temperature. This mode of operation can provide constant fluid speed sensitivity irrespective of changes in surrounding temperature. Customarily, sensing element 10 is constructed of metal wire or metal film or it may be fabricated from a bulk resistance material or composition. Platinum film is gaining widespread use because of its physical strength and stability when deposited on an oxide ceramic substrate. Platinum, nickel, Balco (nickel/iron alloy) and tungsten wire is often used and tungsten is notable for its strength and temperature coefficient linearity. Most common is platinum because of its ready availability in different forms, but most particularly, because of its exceptional long term stability. The platinum resistance versus temperature characteristic is defined in the art by the Callendar equation above 0° C. and by the Callendar-Van Dusen form of the equation for temperatures below 0° C. It should be noted that the temperature characteristic region of interest for thermal anemometry exhibits a slight downwards cupping away from linearity as temperature increases from 0° C. Advantage can be taken of temperature coefficient of resistance curvature by using different materials for temperature sensitive resistors 12 and 21 in order to obtain greatest flow measurement precision. Nickel has curvature cupping upwards and this becomes particularly useful when one considers the contribution to anemometer error caused by changes in thermal conductivity of air as temperature changes. The combination of a platinum sensing element 10 with nickel temperature sensitive resistors 12 and 21 is beneficial where extremely wide temperature shifts are encountered by the constant temperature anemometer. A high temperature sensor temperature coefficient of resistance can be padded down by the use of a series connected low temperature coefficient resistor as is standard practice in the instrumentation art. Although most metallic resistor materials have positive temperature coefficients, the instant constant temperature anemometer can be fabricated from negative temperature coefficient materials, such as carbon and carbon films, as well as thermistors in various forms.

In a typical circuit, sensing element 10 resistance is 3.3 ohms at room temperature and about 4.5 ohms at 125 to 135 degrees Celsius for a platinum element. Power resistor 20 is 4.5 ohms, power resistor 11 is 2 ohms, resistor 22 is 1,000 ohms, and temperature sensitive resistors 12 and 21 are 1,000 ohms each at room temperature. Resistor 13 is about 222 ohms for the indicated 4.5 ohm hot sensing element 10 operating temperature. A further discussion of bridge within a bridge constant temperature anemometer construction is taught by U.S. Pat. No. 4,279,147.

The above described circuit of FIG. 3 discloses use of two temperature sensitive resistors in order to provide constant temperature difference operation of the sensing element 10 above sensed ambient temperature changes in order to arrive at constant flow sensitivity. Where the surrounding environment is at a stable constant temperature or if it is desired to operate sensing element 10 at a fixed constant temperature, the FIG. 3 circuit can alternatively be used to differentially operate a single anemometer sensing element 10 by replacing temperature sensitive resistors 12 and 21 with low temperature coefficient fixed resistors. When this is done, the sensing element 10 will be operated at a fixed and invariant constant temperature that is determined by the stability of the fixed bridge component resistance values selected by the operator. In this manner one may retain the advantage of offset-free differential operation of a single sensing element.

Industrial Applicability

The temperature compensated constant temperature anemometer of the present invention is adapted for use in various types of commercial apparatus for sensitive wide dynamic range measurement of the speed or mass flow of the fluid stream in which the anemometer sensing element is immersed. For example, the present invention may be used as a fast response aircraft airspeed sensor or aircraft turbulence probe, operable over an exceptionally wide dynamic range, unlike more conventional pitot-static tube based pneumatic airspeed and air data systems. Yet another application is in the precise measurement of omni-directional wind speed magnitude from zero wind speed to near supersonic wind speeds. Conventional mechanical anemometers and lightweight propeller anemometers cannot obtain usable wind speed measurements down to zero wind speed, rendering them virtually useless for diffusion measurements. A significant attribute of the present invention is the ability of the temperature compensated constant temperature anemometer to make stable, long term, precision measurements of threshold flow such as diffusion conditions and conditions where, for example, vortex turbulence eddy decay is to be determined, as at airport runways.

It is therefore to be understood that, within the scope of the appended claims, the invention may be practiced otherwise than as specifically described.

What is claimed is:

1. In a constant temperature anemometer of the type having bridge circuit means with feedback circuit means operatively connected to said bridge circuit means,
   a Wheatstone bridge operatively connected as one arm of said bridge circuit means, said Wheatstone bridge comprising a single non-zero temperature coefficient resistive anemometer sensing element together with two fixed resistors and an ambient temperature sensing resistor, one end of said sensing resistor being operatively connected to said anemometer sensing element such that said sensing resistor is not in series with said anemometer sensing element, and
   a second ambient temperature sensing resistor operatively connected as one arm of said bridge circuit means, one end of said second sensing resistor being operatively connected to said Wheatstone bridge,
   wherein a signal output is taken by a differential amplifier operatively connected across said Wheatstone bridge.

2. A constant temperature anemometer comprising:
   (a) a non-zero temperature coefficient resistive anemometer sensing element connected in series with a resistor, and a pair of series-connected balancing resistors connected in parallel across said anemometer sensing element and said series-connected resistor so as to form a first four-arm Wheatstone bridge;
   (b) one of said series-connected balancing resistors, which is adjacent to and connected at one end to said anemometer sensing element, having a non-zero temperature coefficient and functioning as an ambient temperature sensor to modify bridge balance in accordance with variations in sensed ambient temperature;
   (c) said first Wheatstone bridge being operatively connected in series with a resistor, and a pair of series-connected balancing resistors connected in parallel across said first Wheatstone bridge and said series connected resistor so as to form a second four-arm Wheatstone bridge;
   (d) said second Wheatstone bridge being operatively connected to a differential error amplifier whose output error signal is fed back, in a negative feedback manner, to the top of said second Wheatstone bridge, the top of said second Wheatstone bridge being defined as the junction point of said pair of series-connected balancing resistors with said series resistor connected to said first Wheatstone bridge, and the bottom of said second Wheatstone bridge being defined as the junction point of the opposite end of said series-connected balancing resistors with the other end of said first Wheatstone bridge, thereby providing for bridge excitation and consequent operation of said anemometer sensing element as a constant temperature anemometer transducer, wherein the error signal is taken from the junction of the top of said first Wheatstone bridge and said series resistor and from the junction of said series-connected balancing resistors which form said second Wheatstone bridge operated as a feedback controlled bridge;

(e) one of said series-connected balancing resistors forming said second Wheatstone bridge, which is opposite said first Wheatstone bridge and connected at one end to said anemometer sensing element, having a non-zero temperature coefficient and functioning as an ambient temperature sensor to modify the balance of said second Wheatstone bridge in accordance with variations in sensed ambient temperature; and, (f) a second balanced differential amplifier means operatively connected across said first Wheatstone bridge with said second amplifier's two input signals being derived from the junction of said pair of series-connected balancing resistors and the junction of said anemometer sensing element and series resistor, wherein said second balanced differential amplifier produces an amplified output signal which is a measure of the fluid flow speed across or past said anemometer sensing element and the resistors functioning as ambient temperature sensors.

3. A constant temperature anemometer as defined in claims 1 or 2, wherein said resistors functioning as ambient temperature sensors are fixed resistors.

4. A constant temperature anemometer as defined in claim 1 or claim 2, wherein said resistors functioning as ambient temperature sensors are nickel and said anemometer sensing element is platinum.

5. A constant temperature anemometer as defined in claim 1 or claim 2, wherein said resistors functioning as ambient temperature sensors are nickel/iron alloy and said anemometer sensing element is platinum.

6. A constant temperature anemometer as defined in claim 1 or claim 2, wherein said resistors functioning as ambient temperature sensors are tungsten and said anemometer sensing element is platinum.

7. A constant temperature anemometer as defined in claim 1 or claim 2, wherein said resistors functioning as ambient temperature sensors are nickel and said anemometer sensing element is tungsten.

8. A constant temperature anemometer as defined in claim 1 or claim 2, wherein said resistors functioning as ambient temperature sensors are nickel/iron alloy and said anemometer sensing element is tungsten.

9. A constant temperature anemometer as defined in claim 1 or claim 2, wherein said resistors functioning as ambient temperature sensors are a material with a temperature coefficient characteristic deviation away from linearity that is opposite to the temperature coefficient characteristic deviation from linearity of the anemometer sensing element material, exemplified as concave upwards for said temperature sensors and concave downwards for said anemometer sensing element.

* * * * *